US008904984B2

(12) United States Patent
Hanft et al.

(10) Patent No.: US 8,904,984 B2
(45) Date of Patent: Dec. 9, 2014

(54) SYSTEM AND METHOD TO ENFORCE EXCESSIVE ENGINE IDLE CONTROL

(75) Inventors: Jeffrey Hanft, Miami, FL (US); Erik C. Ordonez, Miami, FL (US); Juan Blanco, Miami, FL (US)

(73) Assignee: Skypatrol, LLC, Miami, FL (US)

( * ) Notice: Subject to any disclaimer, the term of this patent is extended or adjusted under 35 U.S.C. 154(b) by 1147 days.

(21) Appl. No.: 12/793,188

(22) Filed: Jun. 3, 2010

(65) Prior Publication Data

US 2010/0324800 A1 Dec. 23, 2010

Related U.S. Application Data

(60) Provisional application No. 61/187,836, filed on Jun. 17, 2009.

(51) Int. Cl.
*G06F 19/00* (2011.01)
*F02N 1/00* (2006.01)
*F02N 11/08* (2006.01)

(52) U.S. Cl.
CPC ..... *F02N 11/0803* (2013.01); *F02N 2200/0802* (2013.01); *F02N 2200/106* (2013.01); *F02N 2200/123* (2013.01)
USPC ......................... 123/179.4; 701/112; 701/117

(58) Field of Classification Search
CPC ............................... F02D 41/062; F02D 41/08
USPC ......... 123/179.4, 479, 179.1, 179.3; 701/112, 701/117
See application file for complete search history.

(56) References Cited

U.S. PATENT DOCUMENTS

| | | | |
|---|---|---|---|
| 4,619,231 A | 10/1986 | Stolar et al. | |
| 5,454,768 A | 10/1995 | Jones et al. | |
| 6,060,981 A * | 5/2000 | Landes | 340/426.12 |
| 6,463,900 B1 * | 10/2002 | Wakabayashi et al. | 123/179.4 |
| 2006/0271246 A1 * | 11/2006 | Bell et al. | 701/1 |
| 2008/0234878 A1 * | 9/2008 | Joao | 701/2 |

* cited by examiner

*Primary Examiner* — John Kwon
(74) *Attorney, Agent, or Firm* — Saliwanchik, Lloyd & Eisenschenk, P.A.

(57) ABSTRACT

A system and method for engine idle control enforcement is provided. According to one embodiment, a vehicle is monitored to determine whether it has moved a particular distance over a period of time or is moving at a particular speed. The monitoring can be accomplished using, for example, a GPS capable device. A determination can be made based on the vehicle distance or speed over a period of time as to whether the vehicle is in idle. When a determination is made that the vehicle is idle, an activation of one or more relay switches can occur to kill the engine and/or disable the starter. A park gear signal can be used as a safety mechanism to avoid killing the engine when the vehicle is determined to not be in park. In one embodiment, in order to reengage the vehicle's engine, the turnkey must be moved to the OFF position before turning the ignition ON.

31 Claims, 2 Drawing Sheets

SYSTEM AND METHOD TO ENFORCE EXCESSIVE ENGINE IDLE CONTROL

CROSS-REFERENCE TO RELATED APPLICATION

The present application claims the benefit of U.S. Provisional Application Ser. No. 61/187,836, filed Jun. 17, 2009, which is hereby incorporated by reference in its entirety, including any figures, tables, or drawings.

BACKGROUND OF INVENTION

A vehicle engine at idle is operating at a minimum speed to generate enough power to operate its ancillaries, such as the water pump, alternator, and other accessories, such as air conditioning, but may not generate enough power to effectively move the vehicle.

An idling vehicle is a vehicle that has its engine running while parked or not in use. Often a driver deliberately allows the engine to idle in order to "warm up" the car, do an errand, wait for someone while retaining personal comfort, listen to the radio, or park illegally.

Currently, effort is being made to reduce the amount of time vehicle engines spend idling. Many states have implemented regulations limiting the number of minutes a vehicle can idle. Fines ranging from a few hundred dollars (U.S.) to thousands of dollars (U.S.) can be incurred for failing to follow the idling regulations. Indeed, the United States Environmental Protection Agency (EPA) has compiled a list of over 30 states having state, county and/or local anti-idling regulations. In addition, many organizations, such as American Transportation Research Institute (ATRI) provide a compendium of idling regulations. The basis for implementing these regulations stems from fuel economy and emissions concerns.

However, in addition to the environmental impact of excessive idling, excessive idling can contribute to the damage of certain engine components, including cylinders, spark plugs, and exhaust systems.

An idling engine is not operating at its peak temperature, which means that fuel does not undergo complete combustion. This leaves fuel residue that can condense on cylinder walls, where they can contaminate the oil and damage parts of the engine. For example, fuel residues are often deposited on spark plugs. As idling time increases, the average temperature of the spark plug drops. This can cause the plug to get dirty more quickly, which may increase fuel consumption. Excessive idling also lets water condense in the vehicle's exhaust, which can lead to corrosion and reduce the life of the exhaust system.

Accordingly, research continues to be conducted to provide start-stop systems to shut off a vehicle engine when it would otherwise be idling.

BRIEF SUMMARY

The present invention provides methods and devices for minimizing engine idle time. Embodiments of the present invention can be used for master control of a vehicle to reduce excessive engine idle time.

In accordance with the invention, a system is provided that can process vehicle positioning data to determine the distance traveled and/or the speed of the vehicle and make a determination as to the idle status of the vehicle. Once it is determined that the vehicle is idling, a timer can run to allow the vehicle to remain in idle until a predetermined amount of time passes.

Once the predetermined amount of time passes, the subject system can force the vehicle to stop idling. For example, one or more signals can be sent to kill the engine and disable the starter. A safety mechanism can be included to ensure that the signals are sent when the vehicle is in park, and not while the vehicle is in motion.

In one embodiment, in order to reengage the vehicle's engine, the turnkey must be moved to the OFF position before turning the ignition ON.

DETAILED DISCLOSURE

Figure 1:
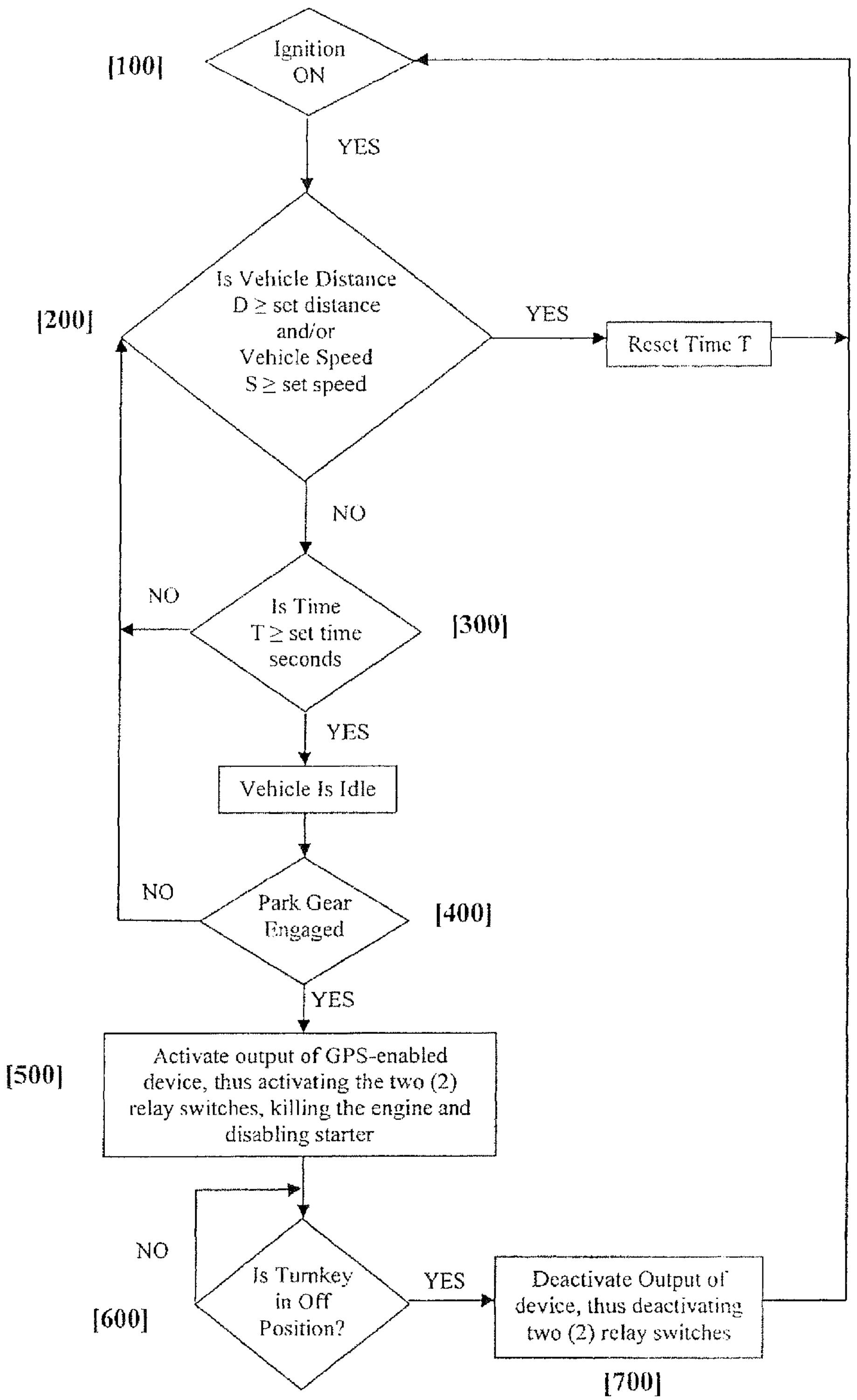
FIG. 1 shows a flowchart of a method for enforcing engine idle control in accordance with an embodiment of the present invention.

Embodiments of the present invention provide systems and methods for enforcing engine idle control. The systems and devices of the present invention can be used to determine the idling status of a vehicle engine and affect the running of the engine in order to reduce excessive engine idling. According to an embodiment of the present invention, the subject system can minimize the occurrence of engine kill while the vehicle is in motion by sensing the engaged gears and using that signal as a safety switch.

Embodiments of the present invention can be adapted for use with any vehicle. In addition, specific control values can be adjusted to conform to desired engine kill and restart conditions.

The systems and methods of the present invention can be applied to control company fleets. For example, the cars and trucks in a company's fleet can be outfitted with the subject engine idle control devices in order to reduce the number of citations and fines for excessive idling and/or reduce engine wear. As another example, rental car companies and governmental agencies can use the subject devices to reduce engine wear on their vehicles.

According to an embodiment of the present invention, the subject system can be configured to obtain information regarding the vehicle's speed and/or distance traveled and whether the engine is running. This information can then be utilized to minimize excessive idling. The vehicle information can be obtained directly by connecting a processing module to sensors within the vehicle, computing systems within the vehicle, and/or indirectly through satellite or terrestrial-based positioning systems. The processing module can be configured to receive the vehicle information data and output control signals when certain predetermined conditions are met. The output control signals can be used to activate one or more switches or affect existing signal lines to cause the engine to stop running (i.e. engine kill). The starter can also be disabled using this method.

In accordance with one embodiment of the present invention, the subject system can incorporate a receiver configured to obtain positioning data of the vehicle; a processor that receives as input the data obtained by the receiver and outputting control signals; and switches connected to the engine and/or starter of a vehicle, the switches being controlled by the control signals from the processor. The processor can incorporate a counter. The counter can be used to establish when input to the processor will be analyzed. For example, the processor can use the counter to determine when a reading from the receiver will be used or when a status of the vehicle will be checked. The counter can also be utilized to determine the length of time the vehicle has been in idle.

The receiver can be capable of obtaining both positioning and timing data. For example, the receiver can be a global positioning system (GPS) receiver. The positioning and timing data can be used by the processor to calculate velocity of the vehicle. The processor can use the positioning and timing data, or just the positioning data alone, to determine the distance the vehicle has moved since a last position reading. In further embodiments, the processor can access speed and/or distance information from the vehicle directly and use the vehicle data in conjunction with the positioning data (and, in some cases, the timing data).

In certain embodiments, the receiver and processor can be provided as a single device or within a single package. For example, a GPS receiver and processor unit can be used. In another embodiment, the processor can be part of a stand alone device that can be configured to receive data from receivers already established in other devices or internal components of the vehicle. Examples of such processors include, but are not limited to microcontrollers such as an ATMEL brand microcontroller and combined circuit components of a programmable timer counter, memory, and programmable switches. In yet another embodiment, the processor can be an existing processor component of the vehicle's computer system that is additionally configured for control of the engine based on data received by a receiver connected to the existing processor component. For such embodiments, the subject switches are connected to the existing computer system to receive output signals for switching control.

In one embodiment, the subject system can be integrated in a vehicle and connected to existing computer systems of the vehicle. In another embodiment, the subject system can bypass the vehicle's computer system to control the engine and other elements.

Figure 2:
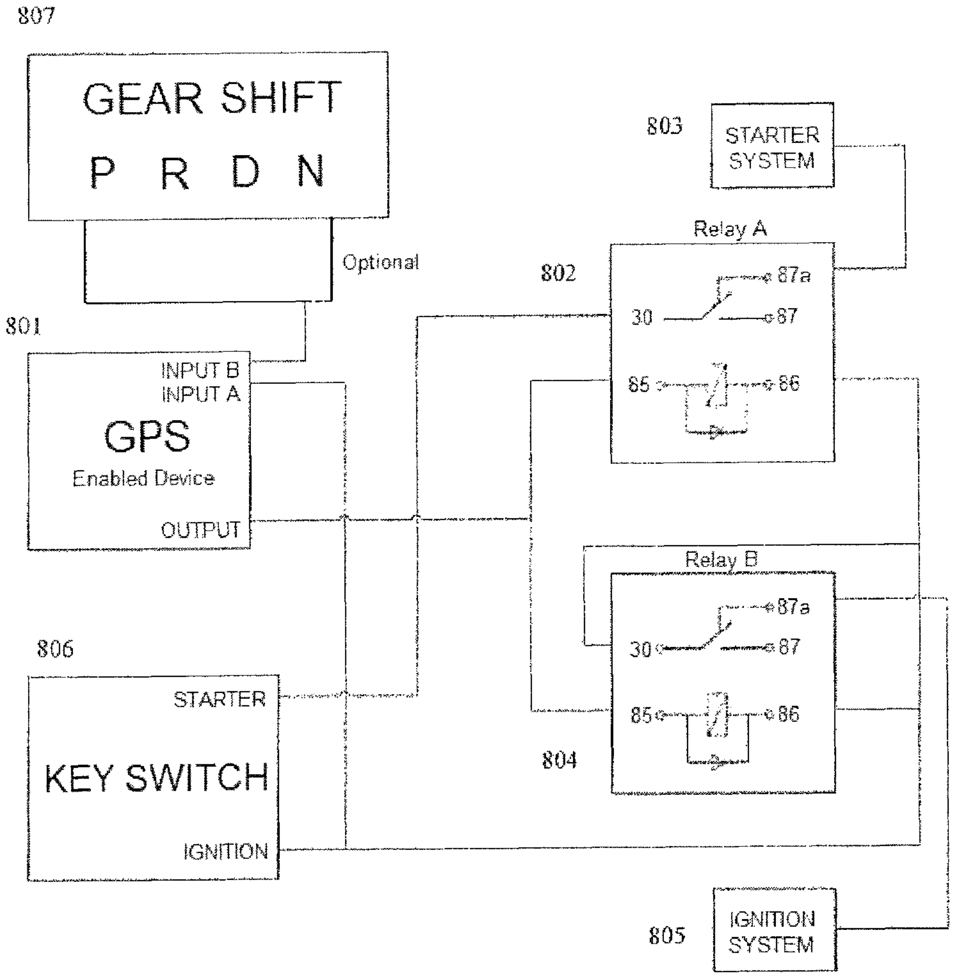
FIG. 2 shows a block diagram of a system for enforcing engine idle control in accordance with an embodiment of the present invention.

A specific implementation of the subject control system and method is shown in FIGS. 1 and 2. Though the subject system is referred to as incorporating a GPS capable device and relay switches, this should only be considered as an example implementation and should not be construed as limiting the types of components involved.

According to the example implementation, the GPS capable device 801 is configured to run an engine kill algorithm. The GPS capable device includes a GPS receiver, a processor, and memory components. The GPS capable device is used to measure velocity and/or distance of a vehicle and incorporates a timer counter. The timer counter can be a distinct component, a software construct, or a counter unit of the GPS controller. In this specific embodiment, the device is connected to the vehicle such that it can obtain data on whether the park gear is engaged. In one embodiment, the signal representing engagement of the park gear of the vehicle is used as a safety switch when performing engine kill.

Though the following example describes using the engagement of the park gear of the vehicle as a safety switch, embodiments are not limited thereto. For example, certain methods can use whether a drive gear is engaged to ensure that the engine kill is not performed when one of the drive gears is engaged. Other methods can use a combination of signals to determine whether the vehicle is not parked. For example, one safety mechanism, similar to the use of the park gear, can be determining the engagement of a neutral gear in combination with the emergency brake and allowing engine kill to be performed if the emergency brake is engaged while the car is in neutral gear for the allotted period of time.

Further safety mechanism embodiments can focus instead on whether a person is in the vehicle. For example, a sensor may be used to detect whether a person is sitting in the driver's seat. As another approach, the subject device can include an audible output (through a speaker or vibrational motor) indicating a warning that the vehicle is considered to be idling; and a person engages the device to indicate presence in the vehicle. One or both of these signals can be used instead of, or in addition to, a signal indicating the engaged gear. When it is determined that there is no one sitting in the driver's seat and that the vehicle meets the idling conditions, the system can then kill the engine.

Referring to FIG. 1, step 100 determines whether the ignition is ON in the vehicle. In one embodiment, this can be accomplished by using the power generated by turning the ignition ON to initiate the processor of the GPS-capable device. A timer counter and a velocity or distance measurement are initiated by the processor while the ignition is ON in the vehicle.

In step 200, the velocity and/or distance measurement information is used to determine if the engine is idle. For example, if the distance measurement indicates a value greater than or equal to a predetermined distance ($D \geq$ set distance), or if the velocity measurement indicates a value greater than or equal to a predetermined vehicle speed ($S \geq$ set speed), then the engine is considered to not be idle and the timer counter is reset. For example, the predetermined distance value can be set to 100 m and/or the vehicle speed value can be set to 2 miles/hour. Smaller or larger values can be used depending on the sampling frequency or the frequency that the speed or distance of the vehicle is determined. The velocity or distance determination can be performed continuously or at particular intervals. If the measurements indicate that the vehicle is not moving, timer counter readings are performed in step 300 to determine how long the vehicle is idle.

If the vehicle is idle for more than some preset time ($T \geq$ set time) as established by the counter (for example, $T=60$ seconds), the park gear signal is checked in step 400 to determine if the park gear is engaged. If the park gear is not engaged, the vehicle distance and/or vehicle speed is continued to be monitored by returning to step 200. If the park gear is engaged, an output signal is activated and outputted from the GPS-capable device to drive the switches as in step 500. As mentioned above, step 400 can use a different safety mechanism, such as reading whether a drive gear is engaged or whether a person is in the vehicle.

For step 500, activation of the switches can kill the engine and disable the vehicle starter. When the switches are not activated, the vehicle continues to function as normal.

In accordance with embodiments of the present invention, the subject method can be implemented through programming of logic or by running a software program that is stored on a computer readable medium using one or more processors. Idle can be defined as occurring if the vehicle has not moved at least a distance D (where, for example, $0<D<100$ m) for more than a set time T determined by the timer counter or if the vehicle speed is less than a set speed S (where, for example, $0<S<2$ miles/hour) for more than the set time T determined by the counter. The set time T can be selected based on regulatory standards for idling in a particular region.

In certain embodiments, the positioning data obtainable through the UPS receiver can affect the value of the set time T. For example, if a vehicle is located in a particular region as determined by the coordinates obtained through the GPS receiver, a particular value for the set time T can be selected to reflect the regulatory requirements of that region. The values for the set times can be stored as a database in memory and accessed based on the coordinate position received from the GPS receiver.

In this implementation, Distance or Velocity condition(s) must be met for the Idle to occur or the timer counter will be reset. According to an embodiment, when the time is reset, the UPS-capable device will wait another set time T to see if Distance or Velocity conditions(s) are met. In addition, the timer counter will reset whenever the vehicle moves at least Distance D or if the vehicle Speed is at least S. When the Distance and/or Speed condition(s) are met in the specified time T the vehicle is said to be idle. When vehicle is idle, the output of the device is activated, which in turn also activates the switches.

In one embodiment, two relay switches can be used, one connected to the engine and the second connected to the starter. The two relay switches can be of type Single Pole, Double Throw (SPDT). When activated, the relay moves to Normally Open position (NO). When in NO position, no current is flowing to Normally Closed (NC) contact, breaking the circuit.

When the two relay switches are activated, the engine and starter of the vehicle are deactivated. According to one embodiment of the present invention, for the driver to restart the vehicle, the driver must put the turnkey in an OFF position before restarting the vehicle. Therefore, in step 600 the device can determine whether the turnkey is in the OFF position. When the turnkey is in the OFF position, the output of the UPS-capable device can be deactivated as in step 700, and the two relay switches become deactivated. Once the output is deactivated, the vehicle can be engaged. Once the vehicle is engaged by turning on the ignition, the monitoring process can begin again (i.e. returning to step 100).

Referring again to FIG. 2, a system in accordance with an embodiment of the present invention can include the GPS capable device 801, which can accept as input signals from a key switch 806 (e.g. through input A) and a gear box 807 (e.g. through input B); and two SPDT switches relay A 802 connected to the starter 803 and relay B 804 connected to the engine 805. In operation, activation of the switches 802 and 804 can occur by creating a closed circuit for the coil of the relays. The turnkey signal from the ignition (key switch 806) provides a power signal at input node 86 of relay A 802 and relay B 804. If the park gear (and/or optionally the neutral gear) from the gear box 807 is engaged, the GPS enabled device 801 reads the signal through input B and provides through its output a ground for node 85 of relay A 802 and relay B 804. The closed circuit causes the coil to generate an electric field, which activates the switch. When activated, the relay moves to Normally Open position (NO), directing the signal to output 87 of relay A 802 and relay B 804. When in NO position, no current is flowing to the Normally Closed (NC) contact at 97A of relay A 802 and relay B 804, breaking the circuit. With the circuit broken, no signal is sent to the engine (ignition system 805) and the starter 803. Turning off the key switch 806 breaks the closed circuit for the coil of the relays, enabling the system to restart.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A system for enforcing engine idle control of a vehicle, comprising:

a processing module connected in the vehicle to receive positioning data of the vehicle and at least one signal from a vehicle component selected from the group consisting of a gear box, a key switch, a parking brake, and a sensor embedded in a driver's seat of the vehicle, wherein the processing module determines position movement of the vehicle based on the positioning data and outputs an activation signal based on conditions of the position movement and the at least one signal; and a switch connected to an engine of the vehicle, the switch being controlled by the activation signal output from the processing module to divert and direct an ignition system signal to the engine of the vehicle.

2. The system according to claim 1, wherein the switch connected to the engine of the vehicle comprises a first relay switch, wherein the first relay switch includes a first coil and a first relay, wherein the first coil is connected at one end to an output of the key switch, and wherein the first coil is connected at another end to an output of the processing module providing the activation signal.

3. The system according to claim 1, further comprising:

a second switch connected to a starter of the vehicle, the second switch being controlled by the activation signal output from the processing module to divert and direct a starter signal to the starter of the vehicle.

4. The system according to claim 1, wherein the processing module is connected to receive a first signal from the key switch and a second signal from the gear box.

5. The system according to claim 4, wherein the processing module is further connected to receive a third signal indicating engagement of a parking brake.

6. The system according to claim 4, comprising the sensor embedded in the driver's seat of the vehicle, wherein the processing module is further connected to receive a fourth signal indicating output of the sensor.

7. The system according to claim 1, further comprising a global positioning system (GPS) receiver connected to the processing module, wherein the processing module receives the positioning data of the vehicle from the GPS receiver.

8. The system according to claim 7, wherein the GPS receiver and the processing module are provided within a single package.

9. The system according to claim 1, wherein the processing module includes an existing processor component of a computer system of the vehicle.

10. The system according to claim 1, wherein the position movement comprises a distance traveled.

11. The system according to claim 10, wherein the position movement further comprises speed of the vehicle.

12. The system according to claim 1, wherein the position movement comprises speed of the vehicle.

13. A method of enforcing engine idle control using a system comprising a processing module connected in a vehicle to receive positioning data of the vehicle and at least one signal from a vehicle component selected from the group consisting of a gear box, a key switch, a parking brake, and a sensor embedded in a driver's seat of the vehicle, wherein the processing module determines position movement of the vehicle based on the positioning data and outputs an activation signal based on conditions of the position movement and the at least one signal; and a switch connected to an engine of the vehicle, the switch being controlled by the activation signal output from the processing module to divert and direct an ignition system signal to the engine of the vehicle, the method comprising:

initiating the system for enforcing engine idle control of a vehicle;

determining idling status of the vehicle using the position movement and the at least one signal; and enforcing vehicle idling regulations by stopping the vehicle from idling, via the activation signal, after the vehicle is determined to be idle.

14. The method of enforcing idle control according to claim 13, wherein initiating the system for enforcing engine idle control of the vehicle comprises receiving input indicating that ignition of the vehicle is enabled.

15. The method of enforcing idle control according to claim 14, wherein initiating the system for enforcing engine idle control of the vehicle comprises receiving input indicating that the key switch of a turnkey is at an ON position.

16. The method of enforcing engine idle control according to claim 13, wherein the system for enforcing engine idle control of the vehicle further comprises a timer counter, wherein determining idling status of the vehicle comprises:

determining a present vehicle distance value from the positioning data;

comparing the present vehicle distance value to a set vehicle distance value;

resetting the value of the timer counter to 0 until the comparing of the present vehicle distance value to the set vehicle distance value indicates that the present vehicle distance value is less than the set vehicle distance value; and comparing a present value of the timer counter to a set time value, wherein the position movement comprises a distance traveled, wherein the idling status of the vehicle is determined to be idling when the present vehicle distance value is less than set vehicle distance value and the present value of the timer counter is greater than or equal to the set time value.

17. The method of enforcing engine idle control according to claim 16, wherein the determining of the present vehicle distance value comprises:

receiving position input data from a positioning receiver of the system as the positioning data; and determining unit distance traveled from previous position input data obtained from the positioning receiver of the system, wherein the unit distance traveled provides the present vehicle distance value.

18. The method of enforcing engine idle control according to claim 16, wherein the determining of the present vehicle distance value comprises:

receiving a present odometer value as the positioning data; and subtracting the present odometer value from a previous odometer value to provide the present vehicle distance value.

19. The method of enforcing engine idle control according to claim 16, wherein determining idling status of the vehicle further comprises:

determining a parking status of the vehicle, wherein the idling status of the vehicle is determined to be idling when the present vehicle distance value is less than set vehicle distance value, the present value of the timer counter is greater than or equal to the set time value, and the parking status is determined to be in park.

20. The method of enforcing engine idle control according to claim 13, wherein the system for enforcing engine idle control of the vehicle further comprises a timer counter, wherein determining idling status of the vehicle comprises:

determining a present vehicle speed value from the positioning data;

comparing the present vehicle speed value to a set vehicle speed value;

resetting value of the timer counter to 0 until the comparing of the present vehicle speed value to the set vehicle speed value indicates that the present vehicle speed value is less than the set vehicle speed value; and comparing a present value of the timer counter to a set time value, wherein the position movement comprises speed of the vehicle, wherein the idling status of the vehicle is determined to be idling when the present vehicle speed value is less than set vehicle speed value and the present value of the timer counter is greater than or equal to the set time value.

21. The method of enforcing engine idle control according to claim 20, wherein the determining of the present vehicle speed value comprises:

receiving position input data from a positioning receiver of the system as the positioning data; and determining unit distance traveled from a previous position input data received from the positioning receiver of the system and an amount of time lapsed from receipt of the previous position input data, wherein the unit distance traveled divided by the amount of time lapsed from receipt of the previous position input data provides the present vehicle speed value.

22. The method of enforcing engine idle control according to claim 20, wherein the determining of the present vehicle speed value comprises:

receiving a present speedometer value as the positioning data, wherein the present speedometer value provides the present vehicle speed value.

23. The method of enforcing engine idle control according to claim 20, wherein determining idling status of the vehicle further comprises:

determining a parking status of the vehicle, wherein the idling status of the vehicle is determined to be idling when the present vehicle speed value is less than set vehicle speed value, the present value of the timer counter is greater than or equal to the set time value, and the parking status is determined to be in park.

24. The method of enforcing engine idle control according to claim 13, wherein determining idling status of the vehicle comprises determining parking status of the vehicle, wherein determining the parking status of the vehicle comprises receiving input from the gear box of the vehicle, wherein the parking status is determined to be in park when the input from the gear box of the vehicle provides a signal indicating that the park gear is engaged.

25. The method of enforcing engine idle control according to claim 13, wherein determining idling status of the vehicle comprises determining parking status of the vehicle, wherein determining the parking status of the vehicle comprises receiving input from the parking brake of the vehicle, wherein the parking status is determined to be in park when the input from the parking brake of the vehicle provides a signal indicating that the parking brake is engaged.

26. The method of enforcing engine idle control according to claim 25, wherein determining the parking status of the vehicle further comprises receiving input from the gear box of the vehicle, wherein the parking status is determined to be in park when the input from the gear box of the vehicle provides a signal indicating that the neutral gear is engaged and the input from the parking brake of the vehicle provides the signal indicating that the parking brake is engaged.

27. The method of enforcing engine idle control according to claim 13, wherein the system for enforcing engine idle control of the vehicle further comprises a timer counter, wherein the enforcing of the vehicle idling regulations comprises setting a time value according to an idling regulation, wherein during the determining of the idling status of the vehicle, a time value of the timer counter is compared to the set time value.

28. The method of enforcing engine idle control according to claim 27, wherein setting the time value according to the idling regulation comprises obtaining the time value from a lookup table in a memory of the system, wherein the time value from the lookup table is selected according to geographical location of the vehicle.

29. The method of enforcing engine idle control according to claim 28, wherein a positioning receiver of the system determines the geographical location of the vehicle, wherein input from the positioning receiver is used to select the time value from the lookup table.

30. The method of enforcing engine idle control according to claim 13, wherein enforcing the vehicle idling rules comprises:

activating the switch of the system in order to stop the engine from running when the idling status of the vehicle is determined to be idling.

31. The method of enforcing idle control according to claim 30, further comprising: deactivating the switch of the system when the key switch of a turnkey is at an OFF position.

* * * * *

UNITED STATES PATENT AND TRADEMARK OFFICE

CERTIFICATE OF CORRECTION

PATENT NO. : 8,904,984 B2
APPLICATION NO. : 12/793188
DATED : December 9, 2014
INVENTOR(S) : Jeffrey Hanft et al.

It is certified that error appears in the above-identified patent and that said Letters Patent is hereby corrected as shown below:

In the Specification

<u>Column 4,</u>
Line 63, "the UPS" should read --the GPS--.

<u>Column 5,</u>
Line 7, "UPS-capable" should read --GPS-capable--.

<u>Column 5,</u>
Line 29, "UPS-capable" should read --GPS-capable--.

Signed and Sealed this
Eighth Day of September, 2015

Michelle K. Lee

Michelle K. Lee
*Director of the United States Patent and Trademark Office*